C. G. CALLAN.
THRESHING CYLINDER AND CONCAVE TEETH.
APPLICATION FILED JULY 6, 1911.
1,052,037.
Patented Feb. 4, 1913.
2 SHEETS—SHEET 1.
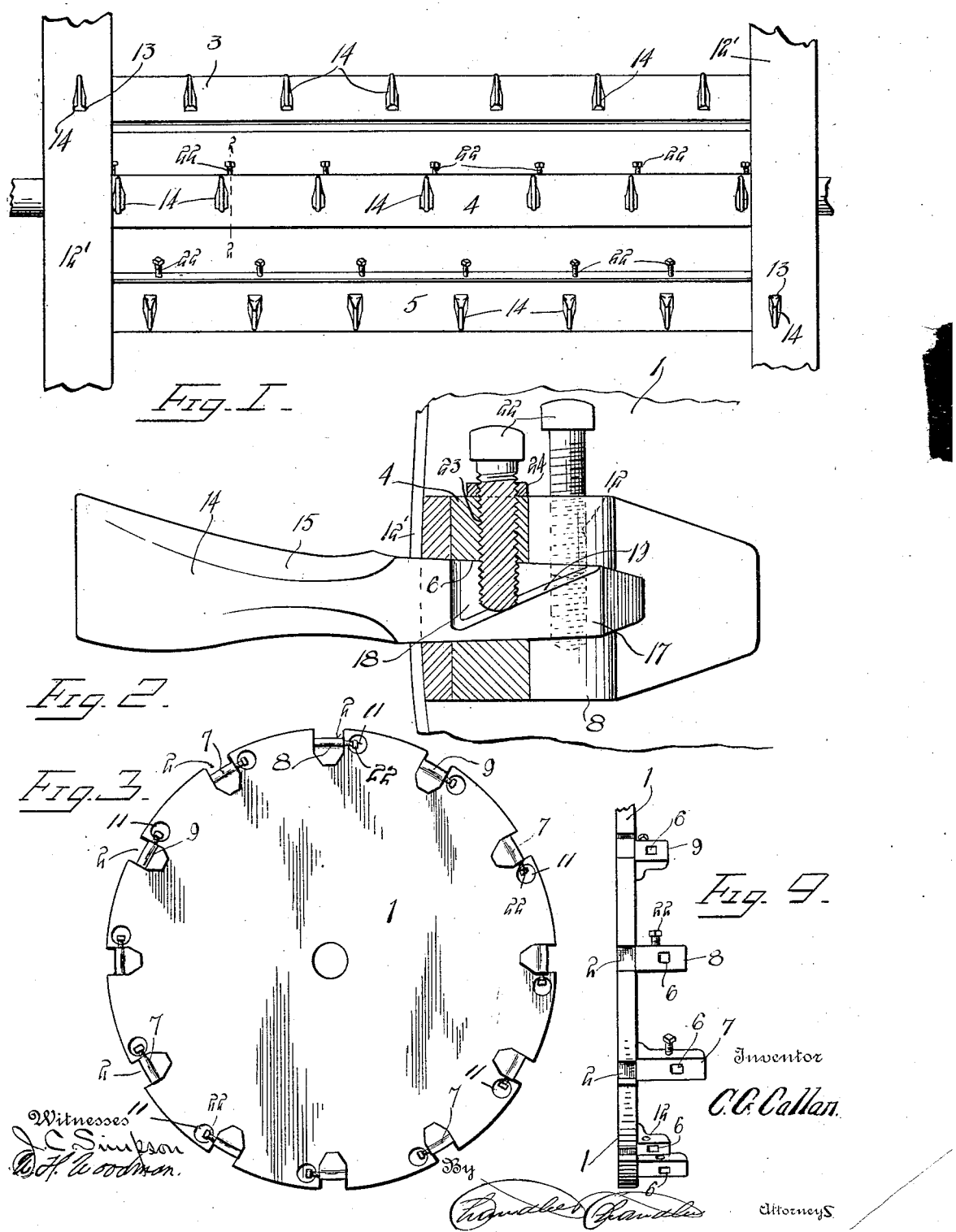

C. G. CALLAN.
THRESHING CYLINDER AND CONCAVE TEETH.
APPLICATION FILED JULY 6, 1911.
1,052,037.
Patented Feb. 4, 1913.
2 SHEETS—SHEET 2.
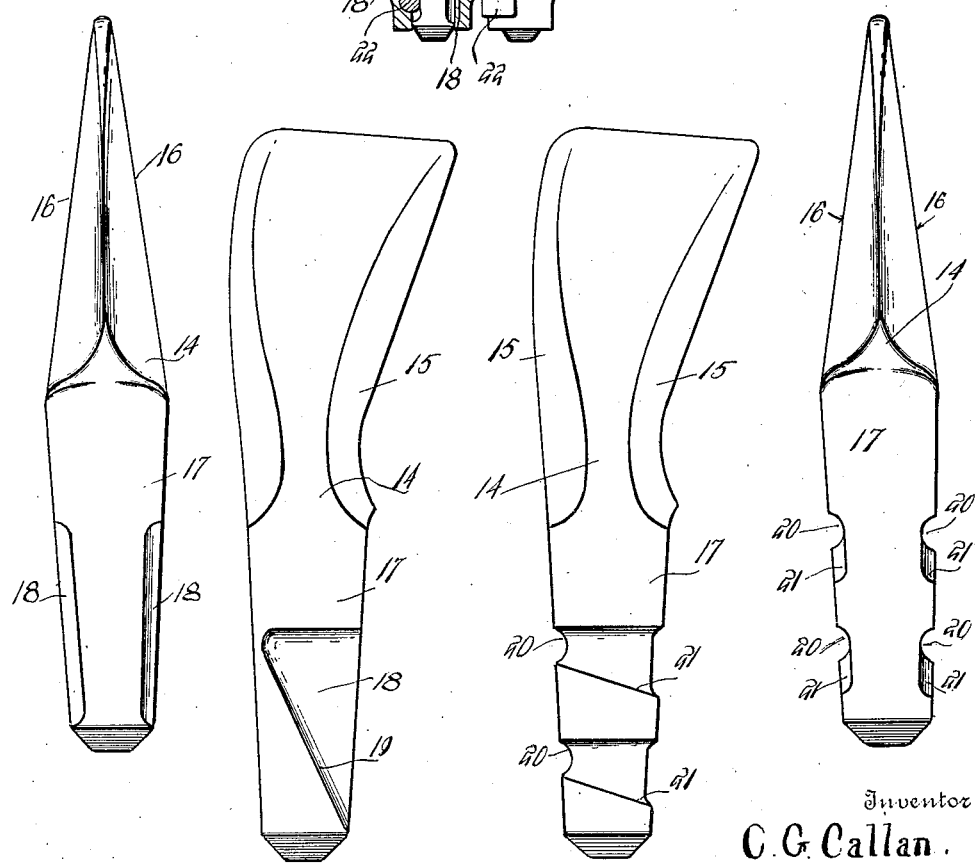
Inventor
C. G. Callan.

UNITED STATES PATENT OFFICE.

CHARLES G. CALLAN, OF CHAMBERLAIN, SASKATCHEWAN, CANADA.

THRESHING CYLINDER AND CONCAVE TEETH.

1,052,037.  Specification of Letters Patent.  Patented Feb. 4, 1913.

Application filed July 6, 1911. Serial No. 637,233.

*To all whom it may concern:*

Be it known that I, CHARLES G. CALLAN, a subject of the King of Great Britain, residing at Chamberlain, in the Province of Saskatchewan, Dominion of Canada, have invented certain new and useful Improvements in Threshing Cylinder and Concave Teeth; and I do hereby declare the following to be a full, clear, and exact description of the invention, such as will enable others skilled in the art to which it appertains to make and use the same.

My invention relates to new and useful improvements in threshing cylinders and concaves and more especially to teeth therefor and the object of my invention is to provide an improved means for forming and fastening the butt ends of the teeth in the cylinder and concave bars, to not only effectually support and hold the teeth rigidly in position, but to prevent the displacement of the teeth in the event of their becoming loosened.

A further object of my invention is to construct teeth so formed and tapered that when the thresher is to be used with dry grain the concave need only be dropped a very slight distance to prevent the kernels from becoming broken, whereas with the teeth now in the market the concave must be dropped to a considerable distance whereby the tough heads pass through without being thoroughly threshed. And a still further object of my invention is to provide a cylinder in which the cylinder teeth are so constructed that the securing of the teeth to the cylinder bars also serves to secure the ring and cylinder bars to the cylinder head.

With these and other objects in view, my invention will be more fully described, illustrated in the drawings which show a preferred embodiment of my device and then specifically pointed out in the claims which are attached to and form a part of this application.

In the accompanying drawings, Figure 1 is a side elevation of a part of the cylinder showing three of the tooth bars in place. Fig. 2 is a section on the line 2—2 of Fig. 1. Fig. 3 is a side elevation of the cylinder head with the tooth bars removed. Fig. 4 is the longitudinal section of the cylinder and concave showing the relation between the teeth. Fig. 5 is a front elevation of one of the teeth. Fig. 6 is a side elevation thereof. Fig. 7 is a front elevation of a modified form of tooth. Fig. 8 is a side elevation of the same. Fig. 9 is an end elevation of the cylinder head showing the recessed lugs by means of which the cylinder bars are secured in place.

Referring more specifically to the drawings in which similar reference numerals designate corresponding parts throughout, 1 designates one of the cylinder heads which as shown is provided with a plurality of spaced part peripheral recesses 2 in which are seated the ends of the cylinder bars which I have here designated by the numerals 3, 4 and 5. As will be seen by referring to the drawings these cylinder bars are all identical in construction with the exception that the squared apertures formed therein for the reception of the teeth are differently positioned in each of the bars by which means the teeth are secured in staggered relation. For the purpose of illustration it is only necessary to show three of the bars as all of the remaining bars are merely duplicates of the bars thus shown and positioned in the same order. Each of these bars is made up of two parts, an inner bar member, an outer bar member, the inner member being somewhat thicker than the outer and each of these members is provided with a plurality of spaced apart squared apertures 6, the apertures of the outer member being so positioned as to register with the apertures of the inner members when said members are superimposed on each other.

The cylinder head as best shown in Figs. 2 and 3 of the drawings is provided adjacent each of its recesses with an inwardly directed lug and as these lugs vary according to the particular cylinder bar which is to be seated in the recess to which the lug corresponds I have denoted these lugs by the numerals 7, 8 and 9. Each of these lugs is provided with a squared aperture 6 adapted to register with the outermost aperture of the cylinder bar which is to be secured thereto and in order to permit of this it is necessary that the lug 8 extend inwardly farther than the lug 7 and the lug 9 farther than the lug 8 as will be readily understood by referring to the drawings. Adjacent each of the lugs 7 the cylinder head is provided with a recessed portion 11 the purpose of which will be hereinafter fully explained. Each of the lugs is provided with a transversely extending bore 12' the inner end of which is bisected longitudinally by one of the sides of the aperture in such a manner that a bolt threaded into the bore will be seated throughout its length therein but at the same time will partially extend into the aperture, the purpose of which construction will be hereinafter explained.

Surrounding the cylinder head is the customary cylinder ring or tire 12 which rests upon the outer ends of each of the cylinder bars as shown and which is somewhat greater in width than the thickness of the cylinder head. This ring is provided with a plurality of spaced apart apertures 13, each of which is adapted to register with one of the apertures 6 of the bar 3, whereby the outermost tooth of each of said bars is passed through the cylinder ring, cylinder bar 3 and lug 7. The outermost teeth of the bars 4 and 5 pass through the bars 4 and 5 and through the lugs 8 and 9 respectively and it will therefore be seen that when these teeth are all secured in place the cylinder ring, bars and head will all be secured together. As will be seen the outermost teeth of the bars 6 are positioned so close to the cylinder head that considerable difficulty will be experienced, under ordinary circumstances, in applying the bolts which lock these teeth in place. To overcome this difficulty I have provided the heads with apertures 11, as previously described, which permit the application of a wrench to these bolts.

Referring more specifically to Figs. 5 and 6 of the drawings my improved teeth will be seen to consist each of a stock portion 14 of the customary shape, with the exception that front and rear edge portions are beveled as at 15 while the side faces of the teeth converge toward each other to form a wedge shaped end portion 16 the purpose of said shaping to be more fully described hereafter. These stock portions terminate at their other end in a squared butt 17 which as shown is slightly tapered to correspond to a slight tapering of the sockets of the tooth bars and lugs of the cylinder head whereby when the butts of the teeth are driven home in said aperture they will closely engage the same. The side faces of each of the butts 17 are provided with triangular shaped recesses 18, said recesses extending at their upper end almost the entire distance across the tooth while the lower side of said recesses extend diagonally toward the end of the butt as shown at 19.

In Figs. 7 and 8 I have shown a slightly modified form of tooth which in place of the recesses 18 is provided upon each side with a pair of transverse recesses 20, said recesses being elongated and rounded at the ends and of less length at one end than at the other so that the lower side of the recess is inclined as at 21. Either form of tooth may be employed as preferred.

In assembling the cylinder the cylinder bars are put in place and the cylinder rings positioned upon the cylinder heads thus serving to temporarily hold the bars in position, all of the teeth of the cylinder bar save those on each end having been previously driven into the sockets formed by the apertures 6 and secured in place by threaded bolts 22 which are passed through transversely extending threaded bores 23 formed in the lower member of the cylinder bar and bisecting the apertures therein in the same manner as do the bores 12 in the lugs on the cylinder head. When the cylinder bars have thus been positioned the remaining teeth are driven into position and secured by means of bolts passed into the bores 12 and engaging with the recesses in the side faces of the teeth. The teeth which are secured to the cylinder bars are held in place by the engagement between the end of the bolt and the outer portion of the recesses 18 or by the outer recesses 20 according to which form of tooth is used. The teeth which are secured by bolts passing through the lugs are secured in place by the engagement between the ends of the bolts and the inner end of the recesses 18 or the inner recesses 20 according to the form of teeth used. These bolts 22 are preferably provided with set nuts 24 to prevent the bolts from working loose.

In Fig. 4 I have illustrated a cylinder and concave in working position showing the manner in which the teeth of the cylinder and the teeth of the concave are positioned with respect to each other when in operation, and it will be seen that by converging the side faces of the teeth to form wedge shaped end portions the concave need be dropped but a slight distance to prevent dry kernels from being chopped and the space thus left is so slight that the grain is thoroughly threshed and it is impossible for a head of grain to pass through. It will also be seen that because of the peculiar construction of the cylinder head and because of the peculiar fastening means employed in securing the teeth therein the securing of the teeth secures the cylinder rings and cylinder bars firmly to the cylinder head.

What I claim is:—

1. A cylinder for threshing machines, comprising cylinder heads having spaced apart radially extending recesses formed in their peripheral edges, double cylinder bars adapted to be positioned with their ends in said recesses, cylinder rings surrounding said head and resting upon the ends of said bars, teeth for said bars, and means for securing said teeth in place, said means also serving to secure the bars and rings to the cylinder heads.

2. A cylinder for threshing machines, comprising cylinder heads having spaced apart radially extending recesses formed in their peripheral edges, lugs formed integrally with said heads and adjacent said recesses, said lugs extending inwardly and being provided with squared apertures forming sockets, double cylinder bars adapted to be positioned with their ends in said recesses, said bars being provided with squared apertures adapted to register with the sockets in said lugs, cylinder rings surrounding said heads and resting upon the ends of said bars, said rings being provided with apertures adapted to register with a portion of the apertures of said bars, teeth for said bars, said teeth having butt portions adapted to be passed through the apertures in the rings and bars and into the sockets of the lugs, and means co-acting with said lugs for securing the teeth in position.

3. The combination with a cylinder for threshing machines, comprising cylinder heads having spaced apart recesses formed in their peripheral edges and lugs formed integrally with said heads and provided with squared apertures forming sockets, said lugs also being provided with transversely extending threaded bores communicating with the inner sides of said sockets throughout their length, cylinder bars adapted to be positioned with their ends in said recesses and having squared apertures adapted to register with the apertures of said lugs, cylinder rings surrounding said heads and resting upon the ends of the bars, said rings being provided with squared apertures registering with the apertures of the bars, of teeth for said cylinder, said teeth having butt portions adapted to be passed through the apertures of the rings and bars and into the sockets of the lugs, the side faces of said teeth being provided with cam faced recesses adapted to be engaged by bolts passed through the bores of said lugs whereby the teeth upon one end of said bars may be readily interchanged with the teeth upon the other end.

In testimony whereof, I affix my signature in presence of two witnesses.

CHARLES G. CALLAN.

Witnesses:
G. F. BLAIR,
W. H. GUNDRY.